March 27, 1962   W. J. CROSHIER ET AL   3,026,622
DIAL BORE GAGES HAVING AN EXTENDED RANGE
Filed March 28, 1960   3 Sheets-Sheet 1
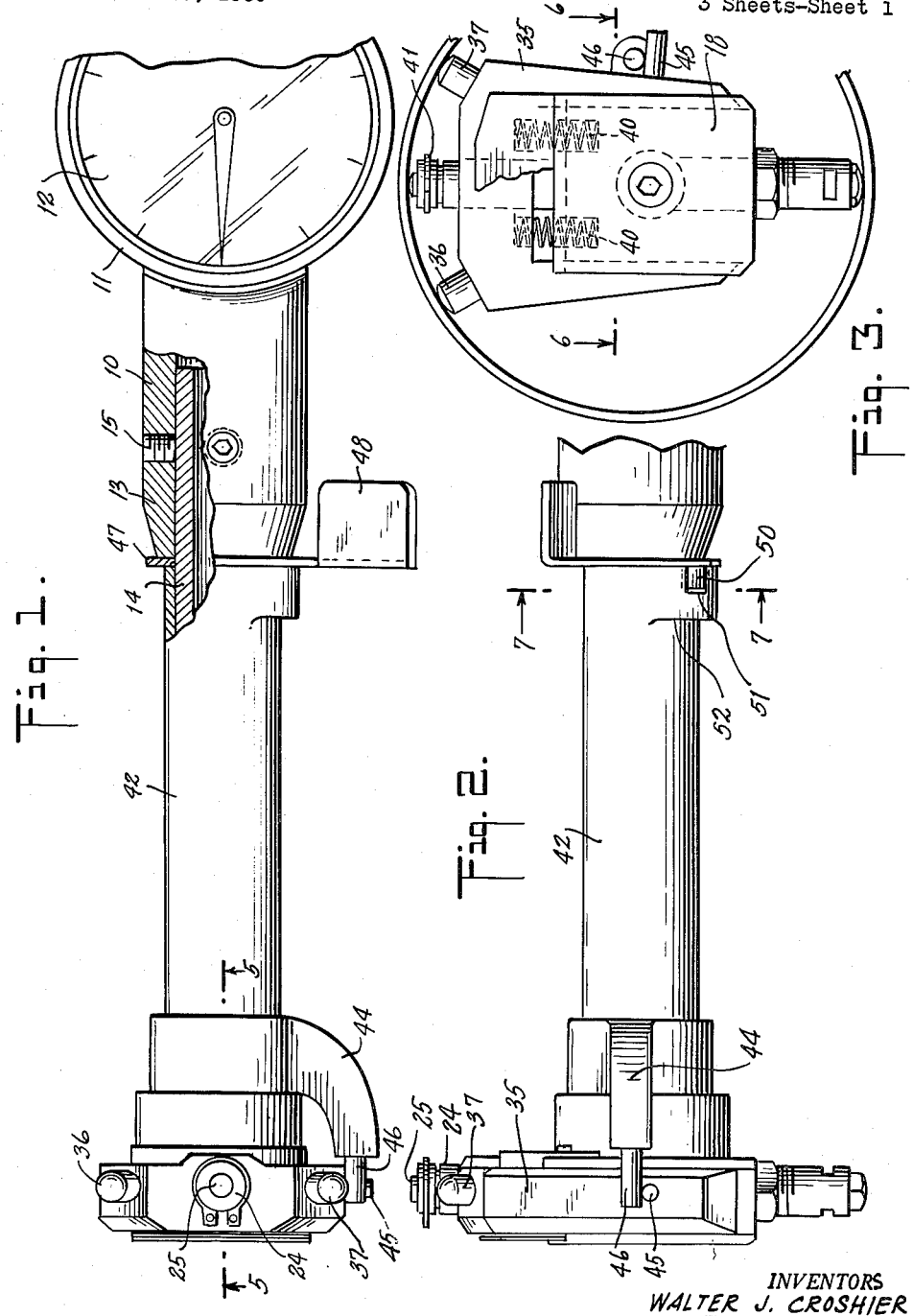
INVENTORS
WALTER J. CROSHIER
FRANK BURGI
BY Darby & Darby
ATTORNEYS March 27, 1962    W. J. CROSHIER ET AL    3,026,622
DIAL BORE GAGES HAVING AN EXTENDED RANGE
Filed March 28, 1960    3 Sheets-Sheet 2
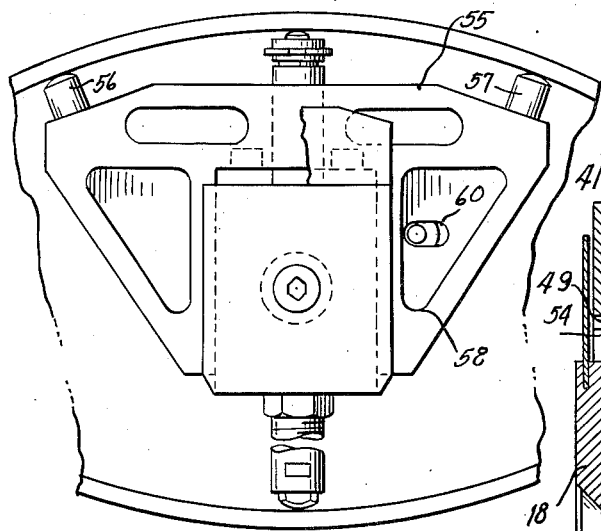
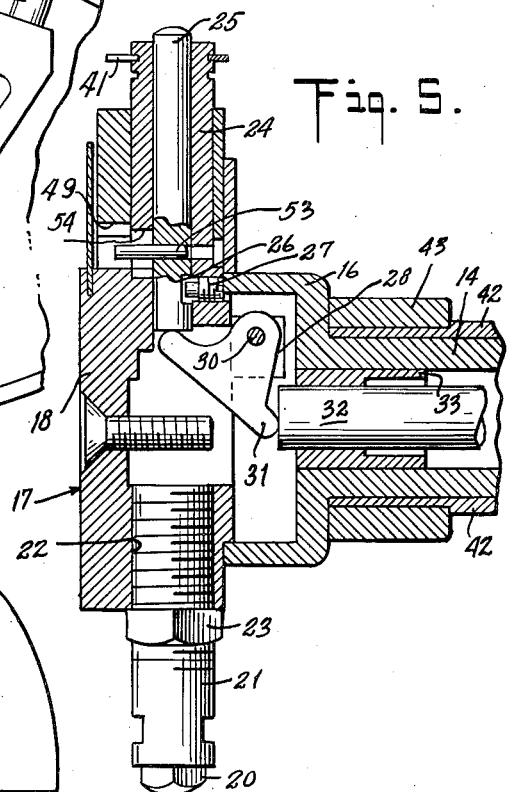
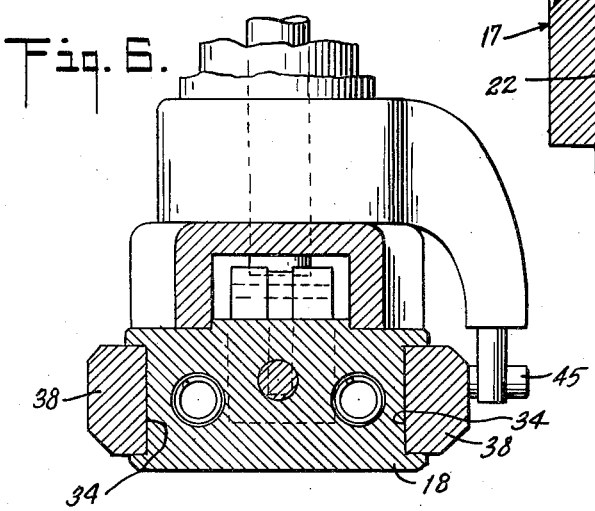
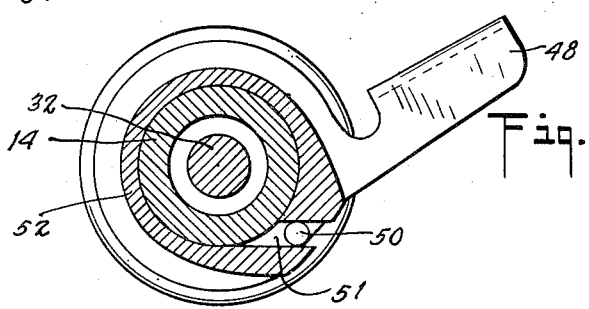
INVENTORS
WALTER J. CROSHIER
FRANK BURGI
BY
Darby & Darby
ATTORNEYS

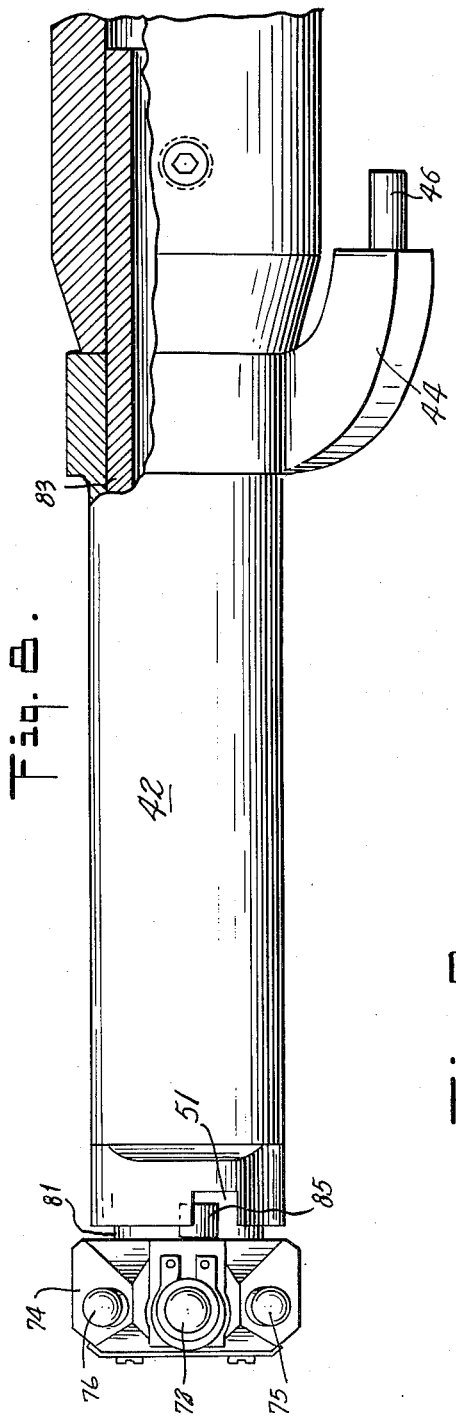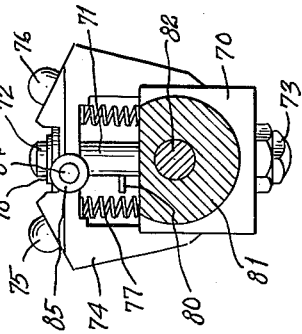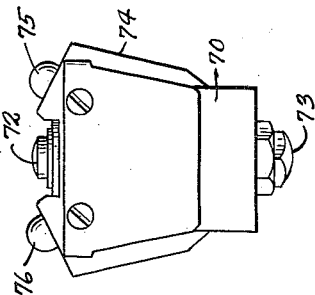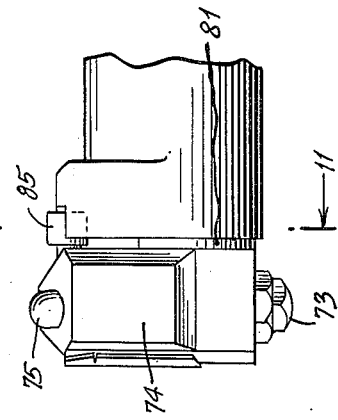
March 27, 1962 W. J. CROSHIER ET AL 3,026,622
DIAL BORE GAGES HAVING AN EXTENDED RANGE
Filed March 28, 1960 3 Sheets-Sheet 3
INVENTORS
WALTER J. CROSHIER
FRANK BURGI
BY Darby & Darby
ATTORNEYS United States Patent Office 3,026,622
Patented Mar. 27, 1962

3,026,622
DIAL BORE GAGES HAVING AN EXTENDED RANGE
Walter J. Croshier, Hyde Park, and Frank Burgi, Poughkeepsie, N.Y., assignors to Standard Gage Company, Inc., Poughkeepsie, N.Y., a corporation of New York
Filed Mar. 28, 1960, Ser. No. 18,086
11 Claims. (Cl. 33—178)

The present invention relates to dial bore gages. In the past it has been customary to utilize a number of gages of this type when bores of widely varying diameters are to be measured since no single instrument was available which could measure bores over the wide range involved. For example, if bores in the range from 1.0000 inch to 12.0000 inches were to be measured it was customary to provide 3 or 4 bore gages in order to properly cover this range.

By means of the present invention a bore gage is provided which, due to the design and construction thereof, permits the substitution of a centralizing yoke of larger size for one of smaller size, thus permitting proper centralizing of the bore gage in a bore over an extended range. In addition, a second measuring head is provided which is readily substituted for the normal measuring head thus further extending the range of possible measurement in the lower direction, that is, making it possible to measure smaller bores.

It is desirable that dial bore gages be provided with means for retracting the centralizing plungers thereof so that the gaging head can more readily be entered into a bore and in order that the gaging head may more readily be inserted past grooves or ridges in the bore. In the present instance a retracting mechanism is provided which by simple adjustment is capable of use with either measuring head and with either centralizing plunger yoke.

It is therefore an object of the invention to provide a dial bore indicator together with certain additional parts whereby the gage can be adapted to measurement of bores in a relatively wide size range.

It is another object of the invention to provide such a wide range dial bore gage wherein two measuring heads are provided, and wherein a plurality of centralizing plunger or pin yokes is provided for one of the measuring heads to make that measuring head utilizable over a relatively wide range of bore measurements.

It is a further object of the invention to provide a retracting mechanism adapted to be used with either of the measuring heads and likewise adapted to be used with any of the centralizing plunger yokes provided.

Other objects and features of the invention will be apparent when the following description is considered in connection with the annexed drawings, in which:

FIGURE 1 is a top plan view of a dial bore gage in accordance with our invention showing the measuring head for larger bores in position and showing the arrangement of the retracting mechanism as utilized with this measuring head;

FIGURE 2 is a fragmentary side elevational view of the dial bore gage of FIGURE 1;

FIGURE 3 is a front elevational view of the dial bore gage of FIGURES 1 and 2 showing the gage or measuring head in position in a bore;

FIGURE 4 is a similar front elevational view of the gage of FIGURES 1 and 2 showing its measuring head in position in a bore. In this figure, however, a larger centralizing plunger yoke has been substituted for the smaller yoke of FIGURES 1 through 3;

FIGURE 5 is a fragmentary cross-sectional view of the gage of FIGURE 1 showing the internal construction of the gaging head and its cooperation with the motion transmitting rod. This view is taken on the plane of the line 5—5 of FIGURE 1;

FIGURE 6 is a horizontal cross-sectional view of the measuring or gaging head of the device of FIGURE 1, the view being taken on the plane of the line 6—6 of FIGURE 3;

FIGURE 7 is a transverse cross-sectional view taken on the plane of the line 7—7 of FIGURE 2 and showing particularly the arrangement of an operating handle for the retraction mechanism;

FIGURE 8 is a fragmentary top plan view of the gage of FIGURE 1 with the small gaging head in position in place of the larger gaging head of FIGURE 1. This view also shows the rearrangement of certain parts to provide means for retracting the centralizing plungers or pins when the small gaging head is in use;

FIGURE 9 is a fragmentary side elevational view showing the small gaging head and that portion of the retractor mechanism which lies adjacent thereto;

FIGURE 10 is a front elevational view of the gaging head of FIGURES 8 and 9; and FIGURE 11 is a vertical sectional view taken on the plane of the line 11—11 of FIGURE 9 and showing particularly the mode of retracting the centralizing plungers.

Referring now to the drawings and particularly to FIGURES 1 through 3, there is provided the usual housing 10, having a cavity 11 in which a dial indicator 12 is positioned, the dial indicator plunger extending through the cylindrical portion of the housing to the left as shown in FIGURE 1. Extending into the cylindrical portion 13 of the housing 10 is a sleeve 14 which is held in position by any suitable means such for example as the setscrew 15.

Integral with sleeve 14 at its left hand end as seen in FIGURES 1 and 5, is a cup shaped member 16 which is fastened to the gaging head generally designated 17. The gaging head 17 comprises a generally rectangular block 18 in which the fixed contact button and the measuring plunger are mounted. Referring particularly to FIGURE 5, the stationary contact button 20 is provided with a shank 21 which is threadedly mounted in the bore 22 of block 18 being fixed in position by means of the lock nut 23.

As is customary, the stationary contact 20 is adjusted to a proper position for measuring tolerance within the limits of the dial indicator or, in other words, set for a specific narrow range within the overall range of possible measurement with the particular gaging head in use. Referring to FIGURE 5, it will be noticed that the bore 22 has a considerable axial extent. As a result, the stationary contact 21 can be of a considerable length thereby permitting use of the gage over a considerable measurement range while at the same time assuring sufficient mating threads to provide ample rigidity.

Integral with block 18 is a guiding sleeve 24 in which the measuring plunger 25 is slidably mounted. Adjacent its lower end the plunger 25 is provided with a flatted portion 26. A screw 27 threaded into the block from its righthand side extends into the notch formed by the flatted portion 26 thus limiting the movement of plunger 25.

Two outwardly extending ears 28, formed integrally with the block 18, have a pivot pin 30 extending therebetween. On this pivot is mounted a T-shaped member 31 one end of the head of which engages the lower end of plunger 25, the other end of the head engaging motion transmitting member 32 which is mounted in the usual manner in the sleeve 14 by means of bearings such as 33.

As is indicated in FIGURE 6, the block 18 has vertically extending guideways 34 formed therein. These guideways accommodate the vertically extending arms of a centralizing yoke of generally U-shape, the yoke being designated 35 in FIGURES 1 through 3 and 55 in FIGURE 4. The two yokes mentioned are generally similar but vary in details of their construction primarily in that the yoke of FIGURE 4 is intended for use in measuring larger bores and has a greater distance between the centralizing pins 56 and 57 thereof than that between the pins 36 and 37 of the FIGURE 1 form. In either case, the yoke is provided with an aperture in the center of the horizontal arm which aperture fits over the sleeve 24, being a relatively loose fit on the sleeve since the guiding action is provided by the ways 34. The centralizing yoke 35 or 55 is spring-pressed outwardly by means of the springs 40 which springs seat in pockets formed in the facing surfaces of the block 18 and the horizontal portion of the particular yoke 35 or 55. The yoke is retained in position on the block by means of a spring clip 41 which engages a groove on the sleeve 24 and thus prevents springs 40 from expanding to an extent to force the yoke off the sleeve.

Referring to FIGURE 6, it will be seen that due to the construction mentioned the guideways 34 are completely exposed when the yoke is removed from the gaging head. Due to this arrangement the guideways and the mating portions of the yokes may be readily cleaned thus assuring that there will be no binding of the yokes and that they will function in the intended manner at all times.

It will be seen that due to the arrangement above described, yoke 35 may be readily removed and yoke 55 substituted therefor, it being only necessary to remove the spring clip 41 thus freeing the yoke which then slides off the block 18. The substitute yoke can then be put into position by sliding it into the guideways 34 and over the sleeve 24 and then replacing the spring clip 41.

In some instances it may be desirable to provide the sleeve 24 with an additional groove as indicated in FIGURES 4 and 5. When this is done an inner limiting position of the centralizing yoke may be utilized by placing the spring clip 41 in the second groove. This makes it possible to more readily enter the gage head into the bore to be gaged when the particular yoke is utilized particularly near the lower limit of its range. This provision of two limiting positions for the yoke is of course advantageous with any one of the yokes in use and in no way interferes with the ready interchangeability of yokes as has been described.

It is at times desirable to be able to retract the centralizing yoke so that the centralizing pins 36, 37 or 56, 57 lie within the minimum diameter of a bore to be measured in order to facilitate entry of the gaging head into the bore, this being particularly true when the bore is provided with a ridge or a groove and measurement is desired beyond that ridge or groove. The retracting means provided comprises a sleeve 42 which is rotatably mounted on the sleeve 14 and which, at its left end, has collar 43 fixed to it. Collar 43 has an integrally extending arm 44 extending outwardly therefrom with its end formed into an L-shape thus extending parallel to the axis of sleeve 42. In the gaging head of FIGURES 1 through 3 a pin 45 extends outwardly from one of the vertically extending arms 38 of the centralizing yoke 35 and the terminating portion 46 of the arm 44 engages this pin so that when the sleeve 42 is rotated the centralizing yoke is retracted. In a similar manner, when the yoke of FIGURE 4 is utilized the terminating portion 46 of arm 44 engages in a slot 60 in one of the vertically extending arms 58 of the yoke. Thus in this case also when the sleeve 42 is rotated the centralizing yoke, together with its centralizing pins, is retracted.

As indicated, the sleeve 42 is rotatably mounted on the sleeve 14. A handle is provided adjacent the housing 10, this handle comprising a washer-like portion 47 terminating in a thumbpiece 48. Washer 47 has suitable means extending therefrom such for example as the pin 50 which engages a notch 51 in an enlarged portion 52 formed at the right hand end of sleeve 42.

The sleeve 42 is held axially in position on the sleeve 14 by being confined between the cup portion 16 of sleeve 14 and the left hand end of housing 10, it being understood that the inner sleeve 14 is held in position in the housing 10 by means of setscrew 15 as previously described. It will therefore be understood that in interchanging centralizing yokes it is necessary not only to remove the spring clip 41 as previously described, but also necessary to loosen the setscrew 15 and move the gaging head axially with respect to the housing in order to release the arm termination 46 from engagement with the pin 45 or the slot 60 as the case may be.

It is frequently desirable that the retracting mechanism not only retract the centralizing pins or plungers, but that it also retract the measuring plunger as, for example, when measurement of the diameter of a groove within a bore is to be made. In order to provide for this retraction of the measuring plunger, a pin 53 extends forwardly or to the left as seen in FIGURE 5 and through a slot 54 in sleeve 24. Thus as the centralizing yoke is retracted the lower surface 49 of the horizontal portion thereof engages pin 53 as the yoke nears its limit of travel and carries the measuring plunger 25 with it until it has reached that limit. As a result, the measuring plunger is retracted when the yoke is retracted to its fullest extent.

In order to utilize the dial indicator gage for measuring smaller bores a separate gaging head is provided which gaging head is generally similar in construction to the one already described in connection with FIGURE 5, but has some slight variation in construction in order to adapt it to use with these much smaller bores. One of the major differences as between the two constructions is that in place of the pivoted T-shaped member for transmitting movement from the measuring plunger to the motion transmitting rod, the measuring plunger 25 is formed as a 45° conical surface at its inner end and the motion transmitting rod, such as 32, is supplied with a similar 45° cone at its outer end, these two conical surfaces being in engagement so that movement of the plunger inwardly with respect to its sleeve causes the same movement of the measuring rod to the right as seen in FIGURE 5. This arrangement is common in the art and is therefore not shown in the drawings.

Referring now to FIGURES 8 through 11, the small gaging head mentioned just above comprises a block 70 similar to the block 18 and having integral therewith a sleeve 71 similar to the sleeve 24. Mounted for sliding movement within the sleeve 71 is the measuring plunger 72 which cooperates with the stationary contact button 73 to form the measuring elements of the gage. In a manner exactly similar to that described hereinabove, a centralizing yoke 74 is provided having the centralizing pins 75 and 76 fixed therein. The pins 75 and 76 extend generally radially with respect to the bore intended to be measured and serve the usual function of causing the gaging head to move into engaging position so that the measuring elements lie on a diameter of the bore.

As in the gaging heads previously described, springs are provided to cause the centralizing yoke to normally be extended to its limit thereby performing the centralizing function. These springs are designated 77 in FIGURES 8 through 11 and the outward movement of the yoke 74 under urge of these springs is limited by means of the spring clip 78 placed in a groove of sleeve 71.

As in the gaging head previously described, a pin 80, fixed in the plunger 72, extends outwardly through a slot in sleeve 71 into position to be engaged by the under surface of the horizontal portion of yoke 74 as it is retracted thereby retracting the measuring plunger 72 during the final retracting movement of the centralizing yoke.

Block 70 has a generally cylindrical portion 81 extending therefrom to the right as seen in FIGURE 8, this portion forming a bearing for the movement transmitting rod 82. A sleeve 83, similar to the sleeve 14, is mounted on the cylindrical portion 81, the usual motion transmitting rod being carried in bushings in the sleeve 83 and the rod 82 bearing against the plunger of the dial indicator in the usual manner.

In order to retract the centralizing yoke a pin 84 extends outwardly (to the right as seen in FIGURE 8) from the horizontal portion of the centralizing yoke 74. This pin is surrounded with a nylon sleeve 85 and when the small gaging head, together with its sleeve 83, is assembled on the housing the retracting sleeve 42 is mounted on the sleeve 83, the retracting sleeve, however, being reversed end for end as respects its position when used with the larger gaging head. Thus the nylon sleeve 85 is now positioned in the notch 51 of the enlarged portion 52 of sleeve 42 and the outwardly extending arm 44 has its terminating portion 46 extending parallel to the sleeve axis and toward the dial indicator thus becoming a convenient operating handle for the retraction mechanism.

From the above it will be seen that in order to utilize the small gaging head it is only necessary to loosen the setscrew 15, remove the large gaging head, remove the retracting sleeve 42 from the sleeve 14, reverse the retracting sleeve, slip it over the sleeve 83 of the smaller gaging head with a notch engaging the nylon sleeve, and then insert the sleeve 83 in housing 10 and lock it in position by tightening the setscrew 15.

As indicated hereinabove, by means of the three gaging heads described, it is possible to gage bore diameters from 1.0000 inch to 12.0000 inches. The smaller gaging head has a range of from 1.0000 inch to 3.0000 inches, the larger gaging head with the smaller centralizing yoke in place thereon has a range of from 2.5000 inches to 8.5000 inches and the larger gaging head with the larger centralizing yoke a range of from 8.0000 inches to 12.0000 inches. Obviously, even larger centralizing yokes can be provided if desired to further extend the range.

As is usual, it will be necessary within the range of any given gaging head and centralizing yoke structure to utilize longer or shorter shanked fixed contact buttons depending upon the portion of the range in which measurement is taking place.

We have thus provided a dial bore gage with auxiliary and replaceable parts which utilizes a minimum number of such replaceable parts and yet extends the useful range of the gage to that normally occupied by a minimum of four complete gages. This of course makes it possible for a user of such gages to minimize his investment therein without at the same time limiting the range of bores which may be gaged with the equipment at hand.

It will be understood that rather than utilizing a dial indicator, a sensing unit might be substituted therefor, either of air or electrical type, and the actual indication be provided at a remote point. Therefore when a dial indicator is specified in the claims it is to be understood that this includes such a sensing unit which, as stated above, may control the operation of a remotely positioned indicator.

While we have described a preferred embodiment of the invention, it will be understood that we wish to be limited not by the foregoing description, but solely by the claims granted to us.

What is claimed is:

1. A gaging head for a dial bore gage, said head comprising, in combination, a generally rectangular block having two faces and four side wall portions, a stationary measuring contact mounted in one side wall of said block, a movable measuring contact slidably mounted in an extension from the opposite side wall portion, supporting and motion transmitting means mounted on one face of said block, guideways formed on the remaining side wall portions, a centralizing yoke of generally U-shape, the arms of said yoke mating with said guideways, the base having an aperture through which said extension protrudes, said centralizing yoke having centralizing pins fixed in the base of the U thereof on the side opposite said block, said centralizing pins lying one on either side of said movable measuring contact, said pins extending generally radially with respect to a bore to be measured, said measuring contacts and centralizing pins lying in a common plane, means urging said yoke outwardly with respect to said movable measuring contact and means for retaining said yoke on said block against the urge of said urging means whereby said centralizing yoke is readily removed from and placed in position on said block.

2. A gaging head for a dial bore gage, said head comprising, in combination, a generally rectangular block having two faces and four side wall portions, a stationary measuring contact mounted in one side wall of said block, a movable measuring contact slidably mounted in an axially extending sleeve formed integrally with said block and in alignment with said stationary contact, supporting and motion transmitting means mounted on one face of said block, guideways formed on the remaining side wall portions, a centralizing yoke of generally U-shape, the arms of said yoke mating with said guideways, the base having an aperture through which said sleeve protrudes, said centralizing yoke having centralizing pins fixed in the base of the U thereof on the side opposite said block, said centralizing pins lying one on either side of said sleeve, said pins extending generally radially with respect to a bore to be measured, said measuring contacts and centralizing pins lying in a common plane, means urging said yoke outwardly with respect to said sleeve and means for retaining said yoke on said block against the urge of said urging means whereby said centralizing yoke is readily removed from and placed in position on said block.

3. A device in accordance with claim 2 wherein said retaining means comprises a groove in said sleeve and a spring clip mounted in said groove and extending over the margins of the aperture in said centralizing yoke.

4. A device in accordance with claim 3 wherein two grooves are provided in said sleeve thereby limiting the outward movement of said centralizing yoke to a different extent depending upon the groove in which said spring clip is positioned to thereby determine the movement of the yoke and facilitate easy entry of the gage head into a smaller bore.

5. A dial bore gage comprising, in combination, a dial indicator housing, a dial indicator mounted therein, said housing having a cylindrical extension into which the indicator plunger extends, a plurality of bore gaging heads each comprising a stationary measuring contact and a movable measuring contact plunger, said measuring contact and contact plunger lying on a diameter of a bore to be gaged, a centralizing yoke mounted for movement parallel to the movement of the measuring contact and having centralizing pins fixed thereto for engaging a bore wall to cause said measuring contact and contact plunger to lie on a diameter of the bore, motion transmitting means cooperating with said measuring plunger to transmit movement from said measuring plunger to the indicator plunger, a first sleeve surrounding said motion transmitting means fixed to a gaging head and removably fixed in said cylindrical extension of said indicator housing and a retracting mechanism for retracting the centralizing yoke of any of said gaging heads, said retracting mechanism comprising a second sleeve rotatably mounted on said first sleeve and having a handle member at the end adjacent said indicator housing, and means at the end adjacent a gaging head for engaging the said centralizing yoke of the gaging head.

6. A dial bore gage as claimed in claim 5 wherein said second sleeve is axially confined between a gaging head and the outer end of said cylindrical extension of said indicator housing.

7. A dail bore gage as claimed in claim 5 wherein at least one of said plurality of gaging heads is provided with a plurality of centralizing yokes, said yokes being interchangeably slidably mounted with respect to said stationary measuring contact and said movable measuring contact plunger.

8. A dial bore gage as claimed in claim 5 wherein at least one of said gaging heads comprises a block of generally rectangular shape, said stationary measuring contact being mounted on one side of said block, said measuring contact plunger being slidably mounted on the opposite side of said block, the remaining sides of said block having ways formed therein, said ways guiding said centralizing yoke for its movement relative to said stationary measuring contact and said movable measuring contact plunger.

9. A dial bore gage as claimed in claim 8 wherein at least one of said gaging heads is provided with a plurality of centralizing yokes, each yoke comprising a generally U-shaped member having an aperture in its base through which said measuring plunger extends and having it arms guided in said ways.

10. A dial bore gage as claimed in claim 9 wherein one of said centralizing yokes has a pin extending laterally therefrom and another of said centralizing yokes has a slot in the same position relative to said block as is occupied by said pin and wherein said second sleeve has a radial arm terminating in an axially extending member, said member cooperating with said pin and with said slot to effect retraction of the associated centralizing yoke with respect to said measuring contact plunger.

11. A dial bore gage as claimed in claim 10 wherein at least one of said plurality of said gaging heads has a centralizing yoke with a pin extending outwardly therefrom on the side facing the indicator housing and wherein said second sleeve has a notch in the end thereof, said notch cooperating with said sleeve to retract said yoke, said second sleeve being positioned on said first sleeve with said radial arm adjacent said indicator housing, said arm serving as a handle for operating said retractor sleeve.

References Cited in the file of this patent

UNITED STATES PATENTS 2,930,134     Bishop et al. _____ Mar. 29, 1960